United States Patent [19]
Marshall

[11] Patent Number: 6,021,896
[45] Date of Patent: Feb. 8, 2000

[54] REUSABLE FLEXIBLE CONTAINER

[76] Inventor: James S. Marshall, 1341 Pebble Springs La., Glendora, Calif. 91741

[21] Appl. No.: 09/111,152

[22] Filed: Jul. 6, 1998

[51] Int. Cl.[7] .................................................. B65D 85/00
[52] U.S. Cl. ...................... 206/315.9; 206/457; 206/579; 220/23.4
[58] Field of Search ............................. 206/315.1, 315.9, 206/579, 504, 315.5, 459.5, 457, 460; 220/23.4; 383/907, 96, 106; 224/919

[56] References Cited

U.S. PATENT DOCUMENTS

| | | |
|---|---|---|
| D. 350,693 | 9/1994 | Pratt . |
| 1,846,748 | 2/1932 | Palmer ...................................... 383/96 |
| 2,066,516 | 1/1937 | Bugg . |
| 2,079,177 | 5/1937 | Membrino ................................. 383/96 |
| 3,047,140 | 7/1962 | Robins . |
| 3,250,387 | 5/1966 | Jacobson et al. . |
| 3,650,395 | 3/1972 | Hobbs . |
| 3,869,043 | 3/1975 | Warner et al. . |
| 4,491,221 | 1/1985 | Lange ................................... 206/315.9 |
| 5,029,704 | 7/1991 | Stillinger . |
| 5,129,516 | 7/1992 | Theros . |
| 5,209,354 | 5/1993 | Thornhill et al. . |
| 5,257,704 | 11/1993 | Gutt . |
| 5,292,161 | 3/1994 | Green ................................... 206/315.9 |
| 5,511,666 | 4/1996 | Grip ..................................... 206/315.9 |
| 5,554,077 | 9/1996 | Coles .................................... 206/315.9 |
| 5,772,090 | 6/1998 | Rodriguez ............................ 206/315.9 |
| 5,775,751 | 7/1998 | Nelson ................................. 206/315.9 |
| 5,839,631 | 11/1998 | Hebert et al. ........................ 206/315.9 |

FOREIGN PATENT DOCUMENTS 1387364  3/1975  United Kingdom .................... 206/427

*Primary Examiner*—Paul T. Sewell
*Assistant Examiner*—Luan K. Bui
*Attorney, Agent, or Firm*—Thomas I. Rozsa; Tony D. Chen; Jerry Fong

[57] ABSTRACT

The present invention is a novel and unique reusable flexible container for products wherein the container is made from a clear flexible material which permits the product to be totally visible to the consumer and also facilitates tactile feel of the product in view of the soft flexible material out of which the container is made. The nature of the design of the present invention container further permits the container to be reused for multiple purposes after the initial purpose for housing the product being sold is finished.

42 Claims, 3 Drawing Sheets

REUSABLE FLEXIBLE CONTAINER

BACKGROUND OF THE INVENTION

1. Field of the Invention

The present invention relates to the field of product packaging. More particularly, the present invention relates to the field of soft packaging which allows the consumer a complete view of the product and allows the consumer to manipulate the product while it is still in the container. In addition the invention may be used for purposes unrelated to its container function once the product has been removed.

2. Description of the Prior Art

The following ten (10) prior art patents are found to be pertinent to the field of the present invention:

1. U.S. Pat. No. 2,066,516 issued on Jan. 5, 1937 to Bugg for "PACKAGE AND METHOD OF PRODUCING THE SAME" (hereafter the "Bugg" Patent).

2. U.S. Pat. No. 3,047,140 issued on Jul. 31, 1962 to Robins for "PACKAGE FOR SPHERE-LIKE ARTICLES" (hereafter the "Robins Patent").

3. U.S. Pat. No. 3,250,387 issued on May 10, 1966 to Jacobson et al. for "REUSABLE BLISTER PACKAGE" (hereafter the "Jacobson Patent").

4. U.S. Pat. No. 3,650,395 issued on Mar. 21, 1972 to Hobbs for "SHRINK WRAP PACKAGE HAVING THE CONTAINERS THEREIN IN CONTACTING RELATION" (hereafter the "Hobbs Patent").

5. U.S. Pat. No. 3,869,043 issued on Mar. 4, 1975 to Warner et al. for "DISPLAY PACKAGE FOR LIPSTICK" (hereafter the "Warner Patent").

6. U.S. Pat. No. 5,029,704 issued on Jul. 9, 1991 to Stillinger for "CORD KEEPER" (hereafter the "Stillinger Patent").

7. U.S. Pat. No. 5,129,516 issued on Jul. 14, 1992 to Theros for "WORKING CLAMSHELL BLISTER PACKAGE FOR TAPE MEASURE" (hereafter the "Theros Patent").

8. U.S. Pat. No. 5,209,354 issued on May 11, 1993 to Thornhill et al. for "REUSABLE BLISTER PACKAGE" (hereafter the "Thornhill Patent").

9. U.S. Pat. No. 5,257,704 issued on Nov. 2, 1993 to Gutt for "TAMPERPROOF LIPSTICK SEAL" (hereafter the "Gutt Patent").

10. U.S. Design Pat. No. Des. 350,693 issued on Sep. 20, 1994 to Pratt for "PACKAGE FOR BALLS AND PUMP" (hereafter the "Pratt Patent").

The Hobbs Patent is a general shrink wrap packaging design which has for its uniqueness the fact that it has two sets of trays as illustrated in FIGS. 1 and 2 respectively, a tray wherein a multiplicity of bottles, in this case particularly twelve bottle can be packaged adjacent each other where the tray at the bottom has indentations to support the bottom of the bottle and the tray on the top has indentations to support the bottle cap and thereafter, a rigid packaging shrink wrap is wrapped around the entire packaging to support the entire structure. FIG. 4 illustrates an embodiment for holding cylindrical containers where only the bottom tray is utilized and the top tray is not needed.

The Jacobson Patent discloses a reusable blister package. Referring specifically to Column 1, lines 29 to 35, the patent states "Another important object of the invention is to provide a transparent plastic package of the blister type with a front side formed of semirigid plastic material and with a rear closure side formed of flexible plastic material, said front and rear sides defining a shallow three-dimensional compartment for containing an article, the rear closure side being readily openable". Referring further to Column 1, lines 50, 51 and 52, it states "Still another object of the invention is to provide a transparent plastic container of the blister type that can be reused." Also referring to Column 1 beginning on lines 25 through 29 it states "It is important object of the present invention to provide a transparent plastic package of the blister type wherein access can readily be had to the article therein for inspection, examination or removal."

The Thornhill Patent discloses a reusable blister package. The patent discloses the concept of having an outwardly facing label sheet that is entirely available for graphic presentations of logos and other product indicia. The packaging itself does not necessarily conform to the shape of the object but is instead used to retain objects therein. The purpose of this packaging is to have a reusable blister package that efficiently uses shelf space while enabling a manufacturer to prominently display its logo, graphics and other indicia. The container is manufactured from three separate parts, a base member, which includes the blister portion, a top member which serves as a lid, and a label sheet or adhesive front sheet. The top member mutably engages the opening of the base member. The label sheet seals the package shut after manufacture and prior to purchase. The package is opened by pulling the label sheet and the top member out and away from the base member and thereby tearing the label sheet along the upper and side portions of the top member. The label sheet located along the lower end of the top member remains untorn and provides a hinge mechanism connecting the lower end of the top member to the lower end of the peripheral flange of the base member. The improved package provides an outwardly facing label sheet that is entirely available for graphic presentations of logos and other product indicia. The packaging cannot be reused and especially not reused for other purposes.

The Stillinger Patent relates to a cord keeper. Specifically, it is a keeper for taking up and storing excess length in an elongated cord such as an electrical cord. Column 1, lines 25 through 29 of the patent state "According to a preferred embodiment of the invention, proposed is an elongate, generally linear, multi-component keeper which is formed unitarily, as by molding, employing a suitable homogeneous material, such as a suitable plastic material." Clearly, this particular keeper which is best illustrated in FIG. 1 and also in FIGS. 6 and 7 is essentially a clear plastic material for holding the cords.

The Gutt Patent discloses a tamperproof lipstick seal comprising a rectangular laminate having affixed to one edge a pull tab which protrudes from the edge of the laminate, lipstick containers containing such a seal, and a method for preventing breakage of a lipstick bullet using the seals of the invention. The specific invention was directed to making items tamperproof when the scare of tampering with items became prevalent several years ago. The invention was directed to the tamperproof seal. There is shown a clear packaging for the lipstick. The purpose of this invention is to provide the seal 3 so that one cannot open up the lipstick and test it out and break the lipstick bullet.

The Warner Patent discloses a display package for lipstick. Specifically, the package includes a backing sheet, a transparent cover sheet raised blister, and a chamber within the blister. The nature of the way the product is oriented enables the lipstick pomade to gravitationally move off its holder when the package is inverted so that the color of the lipstick can be seen by the person without the person touching the lipstick and possibly damaging the lipstick. This also shows a clear ability to visualize the product through clear packaging but is not formed in the shape of the product and does not enable one to actually touch the product directly through the packaging.

The Bugg Patent relates to a package and method of producing the same and the packaging is used with a golf ball. One object of the invention is to provide a method of packaging to secure the golf ball which utilizes paraffin or its equivalent as a coating to hermetically seal the article and to entrap within the seal a film of water to keep the article moist. The golf ball is dipped in a soap solution which leaves a film about the golf ball. While the film is still liquid and in place the golf ball is dipped in melted paraffin and then withdrawn leaving a coating which hardens about the golf ball.

The Robins Patent discloses a package for sphere-like articles and in particular, is designed to house golf balls. In this case you have three golf balls that are aligned in a row and are retained in the tangential or abutting relationship by means of a one-piece sleeve or sheet 18. The sheet or sleeve 18 comprises suitable, shrinkable plastic material, which is transparent to permit the individual to observe the contents of the package. Disposed over the opposite ends of the golf balls at each end of the package are concavo-convex end caps 20 which are also produced from transparent plastic material. The sleeve 18 overlaps the end caps and retains the end caps in position. The sleeve is then shrunk wrapped about the golf balls so it closely adheres to an intermediate portion of the golf balls. It therefore forms a generally hourglass shape as shown. It will not be possible to reuse the plastic after the golf balls are removed from it. In addition, the plastic covering 18 will probably have to be cut or otherwise torn in order to remove the golf balls. Therefore, the concept of this invention is to have the golf balls visible and close enough so they can be felt as well as protected when placed in a golf bag as shown in this patent. It will also obviously not be possible to put promotional items on the shrink wrapped packaging. What is also not shown is to be able to take the item and then thereafter use it for another item after the golf balls are removed.

The Theros Patent is a working clamshell blister package for tape measure. In this case the device is a clamshell blister package for holding and displaying a tape measure. The package includes a first and second substantially mirror image panels which have an upper end, a lower end, a pair of sides and a recess, a base portion being generally trapezoidal in cross-section, the lower ends of the panels being integrally hinged to those of the base portion. The package includes a working platform which provides access so that the tape measure can be withdrawn. This is an open package which is generally conformed to the shape of the tape at its lower portion although clearly, the device only has the use to be held for the tape measure and not for any other use. Also, the package is not necessarily conformed in its entire shape to the overall shape of the tape measure, but it is only the lower portion that is so conformed.

The Pratt Patent is a design patent for a package for balls and a pump. It protects the shape of the design as opposed to what it does. However, the design clearly has blister packs which basically are conformed to the shape of the various balls that are in the package as well as conform to the shape of the pump so one can clearly see the products through the packaging.

In the field of product packaging the typical design is made out of cardboard or a cardboard panel which supports a clear plastic shape which generally conforms the shape of the product. This last example is generally referred to as a "blister pack" due to the process to form the packaging. These conventional designs have the limitation of permitting the consumer only a partial view of the product. The front of the product and part of the sides are generally available for viewing. The remainder of the product is unavailable for viewing due to it being obscured by the cardboard mounting panel.

Another limitation of conventional product packaging is that the packaging is semi-rigid and it is only generally designed to conform to the shape of the product. Oftentimes it is desirable to actually be able to feel the product while it is still within its packaging. Consumers many times make a selection between several competing products simply based upon the determination of the apparent quality of a product based upon a tactile examination. Conventional packaging for products prevent such examinations due to the semi-rigid nature of the blister pack and the packaging only generally reflecting the shape of the product.

Another problem with conventional packaging is it has inherently limited usage. A blister pack, once it has been ripped open or torn off the cardboard plate, is totally useless for any other purpose. A blister pack, once it is removed from the cardboard plate, resembles a bulbous plastic dome-like structure with a flat annular rim. Blister packs are designed with a singular purpose and that is to protect the product until it is ready to be used. These plastic covers are not designed to have any use after they have served their initial purpose. They do not have an area which could act a stand to hold the blister pack in a stable position to provide some future use as a storage container e.g. for small objects, such as on a desk or in a workshop. Once the plastic product cover has been removed from the cardboard plate the cover is quickly discarded to be recycled as a plastic scrap.

Another limitation of conventional packaging is that any trademark or indicia of the manufacturer of the product contained on the a blister pack will lose further exposure to the public once the plastic cover has been discarded. It is commonplace for a manufacturer to place its trademark on the cardboard mounting plate and on the blister pack to obtain as much public exposure as possible for its trademark. Once the product has been removed by the consumer and the plastic cover is discarded, the manufacturer loses valuable exposure of its trademark or indicia to the consuming public from which its trademark rights originate.

It is desirable to provide a design of product packaging which allows the consumer a full view of the product, including the sides and back side. It is also desirable to provide a container which is flexible enough for the consumer to be able to make a tactile examination of the product to determine the quality of the product. It is further desirable to construct a product container which can reused for other purposes and for the ongoing display of the product manufacturer's trademark.

SUMMARY OF THE INVENTION

The present invention is a novel and unique reusable flexible container for products wherein the container is made from a clear flexible material which permits the product to be totally visible to the consumer and also facilitates tactile feel of the product in view of the soft flexible material out of which the container is made. The nature of the design of the present invention container further permits the container to be reused for multiple purposes after the initial purpose for housing the product being sold is finished.

It has been discovered, according to the present invention, that if a flexible container is made out of clear flexible material such as resin, polyurethane, polyvinyl chloride or other flexible material that lends itself to conforming to a specific shape of an exterior object, then the package can be constructed to be clear so that a consumer can see the product inside, and can also be sufficiently flexible to permit the consumer to bend the container and obtain a tactile feel of the product contained inside the container.

It has further been discovered, according to the present invention, that if the flexible container as described above is generally bullet shaped having a rounded top and an open bottom surface which is sealed by an end plug, and further has dimples molded into a surface to simulate the exterior surface of a golf ball, the container can function to retain three golf balls in a vertically aligned position as is customary and further provides an aesthetic and ornamental container which has the added features of enabling the consumer to view the golf balls inside the container and obtain a tactile feel of the golf balls by deforming the exterior surface of the container to press one or more fingers against a golf ball inside the container. It has additionally been discovered that if the flexible ornamental container as described above has a manufacturer's trademark, logo or other recognizable indicia on the exterior surface, and can be affixed to one or more additional flexible ornamental containers, then the ornamental nature of the container combined with its ability to be reused for other purposes permits the purchaser to reuse the container for other purposes, thereby providing the manufacturer with an added benefit of having the manufacturer's trademark and logo before the consumer long after the product sold with the container has been used and discarded. It is therefore an object of the present invention to provide a flexible product container which provides a consumer with a full view of the product, including the sides and back portion of the product.

It is an additional object of the present invention to provide a container which is sufficiently rigid to maintain the products contained therein in a secure manner while at the same time being sufficiently flexible to make tactile examination of the product possible to thereby enable the consumer to determine the quality and other aspects of the product.

It is another object of the present invention to provide a flexible product container which contains on its surface trademarks, logos and other advertising indicia of the company which manufactures and/or sells the product and further has the ability to be combined with one or more duplicate flexible product containers to form a receptacle for articles other than the original products sold in the flexible product container, thereby affording continued display of the manufacturer's trademarks, logos and other advertising indicia.

It is an additional object of the present invention to provide a specialized ornamental container to hold three golf balls, which container has a dimpled surface resembling the surface of a golf ball, is sufficiently rigid to hold three golf balls in vertical alignment, and is sufficiently flexible to enable the consumer to depress the surface of the container in order to have a tactile feel of the golf balls housed within the container.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
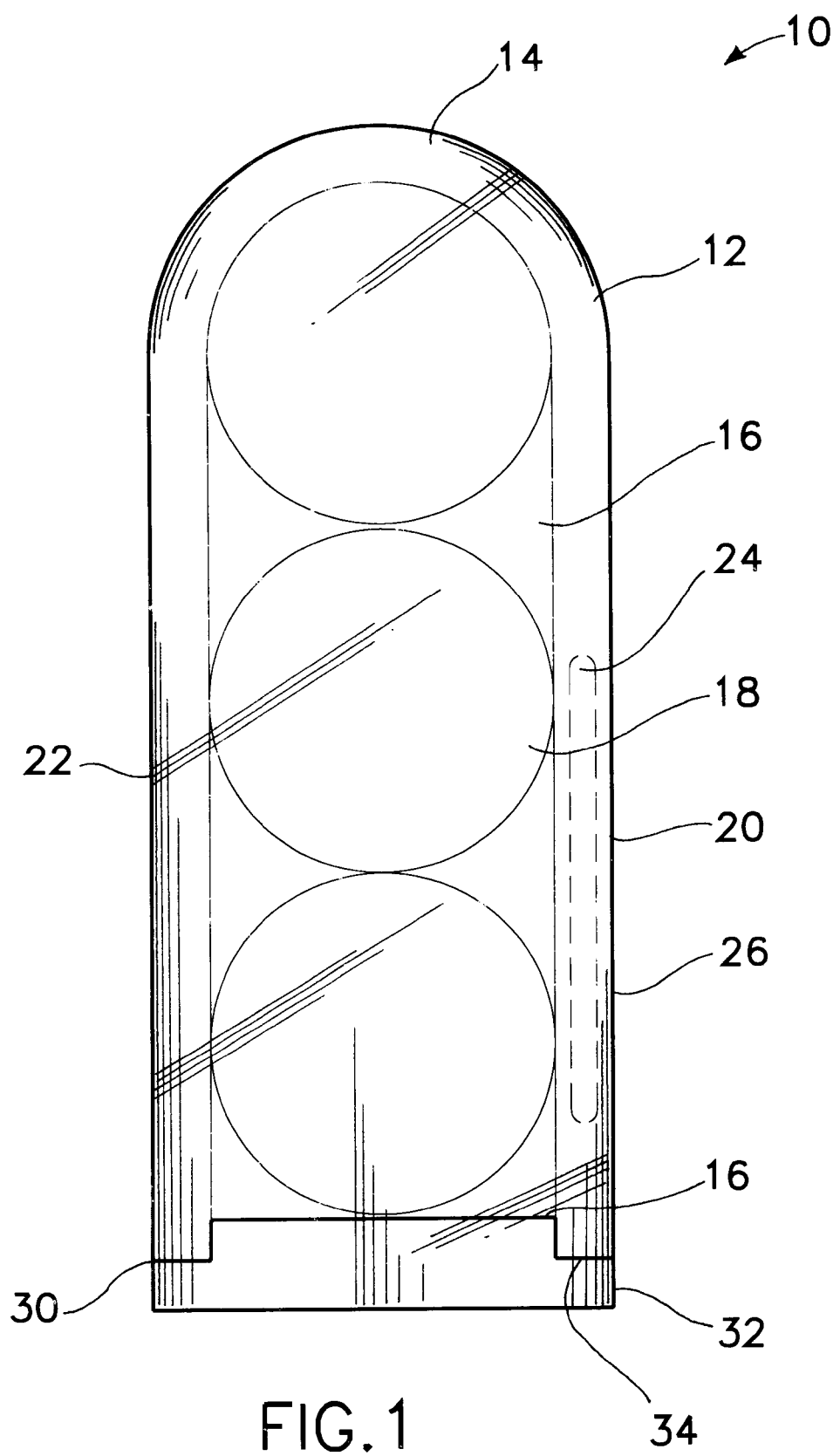
FIG. 1 is an elevational view of one preferred embodiment of the present invention flexible product container having a clear and smooth surface and housing product therein.

Referring to FIG. 1, there is illustrated an elevational view of a preferred embodiment of the present invention flexible product container 10. In a preferred embodiment the flexible product container 10 comprises a tubular shaped body 12 which is formed from a flexible synthetic material, such as polyurethane, polyethylene, alkyd resins, polyvinyl chloride, and other flexible material that lends itself to being sufficiently rigid to retain product within the container and sufficiently flexible to permit the body 12 to be deformed by pressing against the surface of the body 12. In the preferred embodiment, body 12 has a generally arcuate or dome shape closed end 14 thereby giving the flexible product container 10 a generally bullet shaped appearance. The flexible product container 10 has a hollow interior 16 to enable the flexible product container 10 to be filled with at least one product unit 18. In the preferred embodiment of the present invention, the flexible product container 10 is filled with three vertically aligned golf balls 18, which are aligned in a customary packaging manner. The flexible product container 10 is designed to house any type of product, whether it be a circular type product such as a golf ball or any other shaped product where it is desirable for the consumer to be able to feel the product in the container as well as see it.

Another feature of the present invention flexible product contain 10 is to be able to carry trademarks, logos and other advertising indicia on its surface 20. It is within the spirit and scope of the present invention to have advertising indicia 24 on the surface 20. In the preferred embodiment, the advertising trademarks, logos or other advertising indicia 24 of the manufacturer and/or distributor of the product appear on two oppositely disposed portions 22 and 26 of surface 20. The advertising indicia 22 and 26 may be molded into the surface 20, embossed into the surface 20, may be printed, silk-screened or otherwise lithographed onto the surface 20, or may be affixed by labels or other attachment means.

The bottom 34 of flexible product container 10 has an opening 30 which extends into the hollow chamber 16 to permit the product 18 to be inserted into and eventually removed from the flexible product container 10. The opening 30 is closed by a removable end cap or plug 32.

Figure 2:
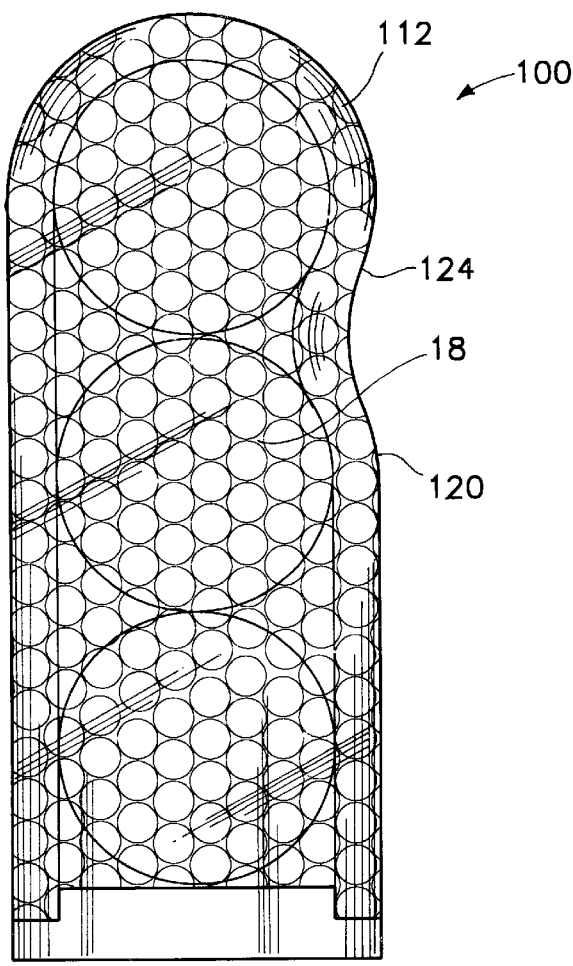
FIG. 2 is an elevational view of a second preferred embodiment of the present invention flexible product container having a dimpled surface and housing product therein.

The surface 20 and body 12 of the flexible product container 10 are shown as being completely clear so the product can be completely visible. In an alternative embodiment illustrated in FIG. 2, the surface 120 of flexible product container 100 is dimpled to simulate the surface of a golf ball. The surface 120 is still clear enough to make the products 18, which in this case by way of example are three golf balls, visible.

Another advantageous feature of the present invention flexible product container 100 (as well as the embodiment 10 illustrated in FIG. 1) is that the body 112 while being sufficient rigid to support three golf balls in a vertical alignment, is also sufficiently flexible to be deformable when pressure is applied against the surface 120 by one or more fingers of a consumer at any selected area on the body 112. By way of example, one selected area is 124 shown depressed in FIG. 2. By applying pressure against the flexible body 112 along any given location of the surface 120, the consumer can feel the golf ball 18 inside and feel the firmness, structural integrity, and other qualities of the golf ball 18.

Figure 3:
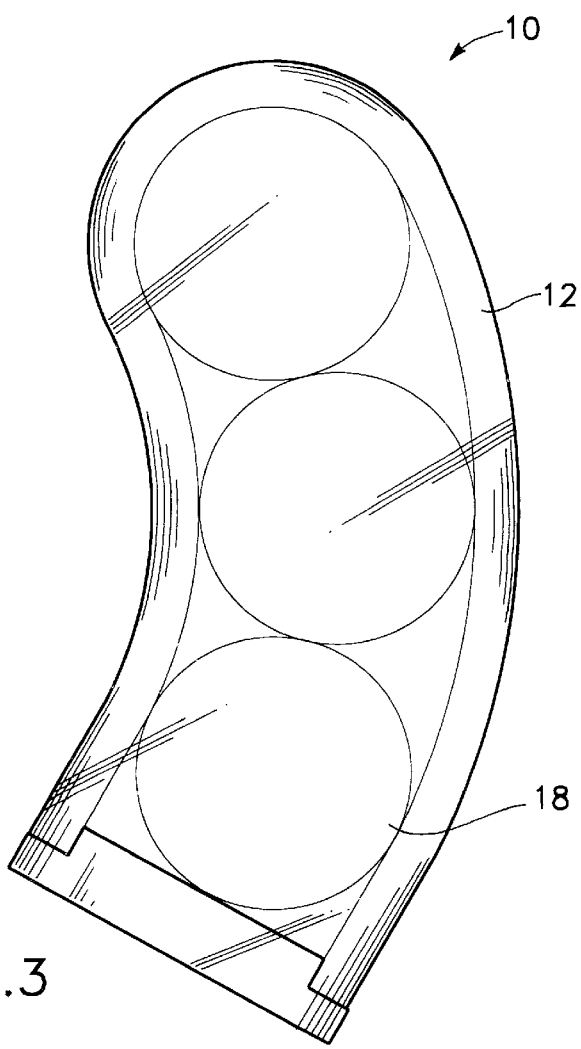
FIG. 3 is an elevational view of the embodiment of the present invention flexible product container illustrated in FIG. 1, and being deformed into a bent condition.

Another advantage of the present invention flexible product container 12 is shown in FIG. 3. Many times sports equipment must be stored in confined spaces, such as a locker, a sports bag or in a glove compartment of an automobile. The flexibility of the present invention flexible product container 10 is shown deformed into a bent shape in FIG. 3 to shorten its length to enable it to fit into a confined space. It should be noted that the product 18 is able to move within the flexible product container 10 as it is articulated into the bent or arcuate shape.

Figure 4:
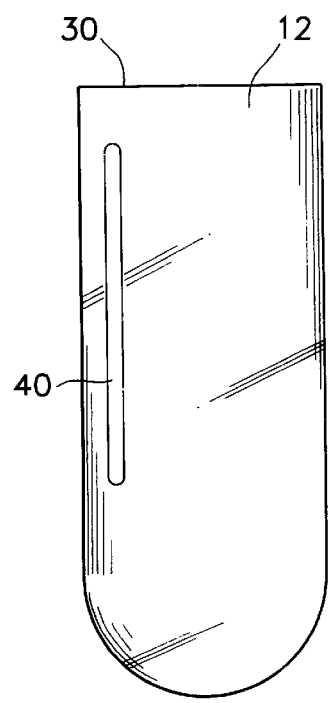
FIG. 4 is an elevational view of the embodiment of the present invention flexible product container illustrated in FIG. 1, and turned upside down and having adhesive applied along a length of its surface.
Figure 6:
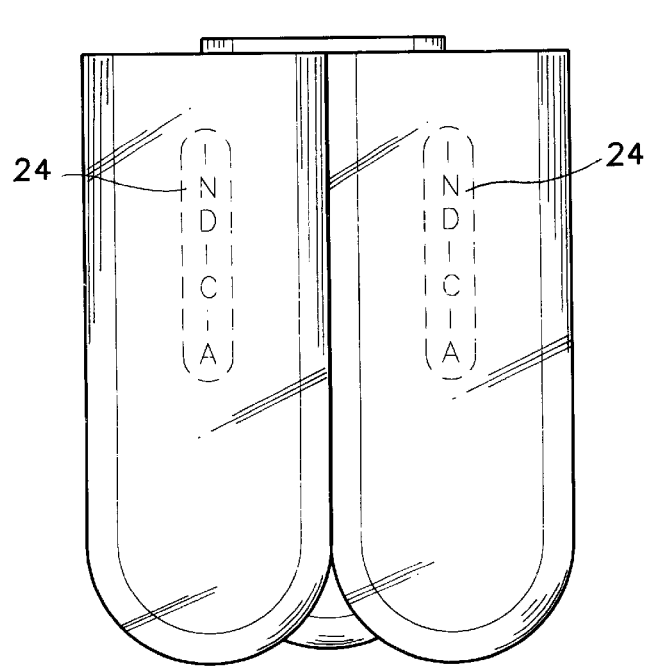
FIG. 6 is an elevational perspective view of a multiplicity of flexible product containers bonded together by adhesive means and used to form a storage unit.
Figure 5:
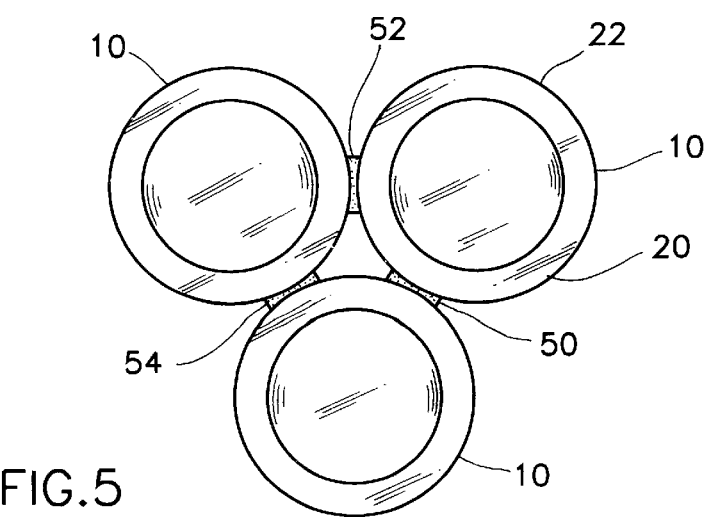
FIG. 5 is a top plan view of a multiplicity of flexible product containers bonded together by adhesive means and used to form a storage unit.

Another advantageous feature of the present invention flexible product container is the ability to combine at least two flexible product containers to form a permanent container for products other than products with which the flexible product container 10 was sold. Two or more flexible product containers 10 can be bonded together by applying at least one bead of adhesive along adjacent portions of opposing surfaces. For use with other objects, the flexible product containers 10 are turned upside down so that opening 30 is on top with the plug or end cap 32 removed. Illustrated in FIG. 4 is a bead of adhesive 40 applied along a length of a surface 20 on body 12 of a flexible product container 10. In addition to a length of adhesive, one or more selected dots of adhesive may be applied to the surface at selected locations. Illustrated in FIG. 5 are three flexible product containers 10 at three separate locations along opposite surfaces 20 by means of adhesive 40 applied along a length of opposing surfaces 20. It is important that the adhesive is applied along at a location of a surface 40 which is remote from the location of the advertising indicia so that the advertising indicia 24 is visible after the flexible product containers are bonded together, as illustrated in FIG. 6. Items such as pens, pencils, or numerous other consumer items can be stored in the assembled multiplicity of flexible product containers which are bonded together by inserting the items through openings 30. In this way, the assembled multiplicity of flexible product containers continues to be used long after the original product with which the containers were sold has been expended. The manufacturer and/or distributor therefore can have its trademark, logo, or other advertising indicia displayed before the consumer on a continuous basis, thereby reinforcing their marketing message and causing the consumer to buy more of their product.

The flexible product container is preferably made out of clear flexible material such as resin, polyurethane, polyvinyl chloride or other flexible material that lends itself to conforming to a specific shape of an exterior object. One preferred material, especially for use with flexible product containers housing golf balls and designed with a dimpled exterior surface to resemble a golf ball is flexible polyvinyl chloride V4-097L. The preferred wall thickness of the body 12 for this preferred embodiment using polyvinyl chloride V4-097L is 0.040 inch, known as 30 point in the industry. The preferred durometer range for this preferred embodiment using polyvinyl chloride V4-097L is 101 to 87 durometer.

While the shape of the flexible product container 10 has been illustrated as being bullet shaped, it will be appreciated that the container can be of any desired shape such as cylindrical, oval, rectangular, square, spherical, or of any arcuate shape, all designed to conform to the overall shape of the product being contained therein and to be ornamentally aesthetic in combination with the product being sold.

Defined in detail, the present invention is a container for housing three golf balls in a vertical alignment, comprising: (a) a body formed into a generally bullet shape having a tubular shaped vertically oriented structure terminating in an arcuate dome shaped top at one end and having a flat bottom at its other end with an opening extending through the bottom; (b) said body further having an exterior surface, a hollow interior chamber for retaining said three golf balls, the hollow interior chamber connected with said opening to facilitate the insertion and removal of the three golf balls from the container, the opening being sealed by a removable closing member; (c) said body being made of clear flexible material which permits total visibility of the three golf balls when the golf balls are within the hollow interior chamber, the flexibility of the body enabling the body to be deformable under ordinary pressure from a finger of a hand to thereby facilitate tactile feel of the golf balls when the golf balls are within the hollow interior chamber; (d) the exterior surface of said body having dimples molded into the surface to simulate a golf ball; and (e) advertising indicia for a product located on at least one location of said exterior surface.

Defined broadly, the present invention is a container for housing three golf balls in a vertical alignment, comprising: (a) a body formed into a generally bullet shape having a tubular shaped vertically oriented structure terminating in an arcuate dome shaped top at one end and having a flat bottom at its other end with an opening extending through the bottom; (b) said body further having an exterior surface, a hollow interior chamber for retaining said three golf balls, the hollow interior chamber connected with said opening to facilitate the insertion and removal of the three golf balls from the container, the opening being sealed by a removable closing member; and (c) said body being made of clear flexible material which permits total visibility of the three golf balls when the golf balls are within the hollow interior chamber, the flexibility of the body enabling the body to be deformable under ordinary pressure from a finger of a hand to thereby facilitate tactile feel of the golf balls when the golf balls are within the hollow interior chamber.

Defined more broadly, the present invention is a container for housing a product, comprising: (a) a body formed into a generally bullet shape having a tubular shaped vertically oriented structure terminating in an arcuate dome shaped top at one end and having a flat bottom at its other end with an opening extending through the bottom; (b) said body further having an exterior surface, a hollow interior chamber for retaining a product, the hollow interior chamber connected with said opening to facilitate the insertion and removal of a product from the container, the opening being sealed by a removable closing member; and (c) said body being made of clear flexible material which permits total visibility of a product when a product is within the hollow interior chamber, the flexibility of the body enabling the body to be deformable under ordinary pressure from a finger of a hand to thereby facilitate tactile feel of a product when a product is within the hollow interior chamber.

Defined even more broadly, the present invention is a container for a product, comprising: (a) a body having an exterior surface, a hollow interior chamber for retaining a product and having an opening at a location in the body to facilitate the insertion and removal of a product from the container, the opening being sealed by a removable closing member; and (b) said body being made of clear flexible material which permits total visibility of a product when a product is within the hollow interior chamber, the flexibility of the body enabling the body to be deformable under ordinary pressure from a finger of a hand to thereby facilitate tactile feel of a product when a product is within the hollow interior chamber.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing fall public disclosure of at least one of its forms. However, such detailed description is not intended in any way to limit the broad features or principles of the present invention, or the scope of patent monopoly to be granted.

What is claimed is:

1. A container for housing three golf balls in a vertical alignment, comprising:
   a. a body formed into a generally bullet shape having a tubular shaped vertically oriented structure terminating in an arcuate dome shaped top at one end and having a flat bottom at its other end with an opening extending through the bottom;
   b. said body further having an exterior surface and a hollow interior chamber for retaining said three golf balls, the hollow interior chamber connected with said opening to facilitate the insertion and removal of the three golf balls from the container, the opening being sealed by a closing member;
   c. said body being made of flexible material, said body being further made of material which permits visibility of the three golf balls when the golf balls are within the hollow interior chamber, the flexibility of the body enabling the body to be deformable under ordinary pressure from a finger of a hand to thereby facilitate tactile feel of the golf balls when the golf balls are within the hollow interior chamber;
   d. the exterior surface of said body having dimples molded into the surface to simulate a golf ball; and
   e. advertising indicia for a product located on at least one location of said exterior surface.

2. The container as defined in claim 1 wherein said body is made out of flexible plastic material.

3. The container as defined in claim 1 wherein said body is made out of flexible polyurethane material.

4. The container as defined in claim 1 wherein said body is made out of polyvinyl chloride material.

5. The container as defined in claim 1 wherein said container is affixed to an adjacent container by adhesive means at a location remote from said advertising indicia so that the advertising indicia remains visible, the containers oriented upside down so that said opening of each container is on top to facilitate insertion and removal of an object from each of said containers after said closing member is removed and said golf balls have been removed.

6. The container as defined in claim 1 wherein said flexible material is transparent which permits total visibility of said three golf balls.

7. The container as defined in claim 1 wherein said body of said container is reusable.

8. The container as defined in claim 1 wherein said closing member is removable.

9. The container as defined in claim 1 wherein said closing member is openable.

10. A container for housing three golf balls in a vertical alignment, comprising:
    a. a body formed into a generally bullet shape having a tubular shaped vertically oriented structure terminating in an arcuate dome shaped top at one end and having a flat bottom at its other end with an opening extending through the bottom;
    b. said body further having an exterior surface and a hollow interior chamber for retaining said three golf balls, the hollow interior chamber connected with said opening to facilitate the insertion and removal of the three golf balls from the container, the opening being sealed by a closing member;
    c. said body being made of flexible material, said body being further made of material which permits visibility of the three golf balls when the golf balls are within the hollow interior chamber, the flexibility of the body enabling the body to be deformable under ordinary pressure from a finger of a hand to thereby facilitate tactile feel of the golf balls when the golf balls are within the hollow interior chamber; and
    d. dimples molded into said exterior surface of said body to simulate a golf ball.

11. The container as defined in claim 10 further comprising advertising indicia for a product located on at least one location of said exterior surface.

12. The container as defined in claim 10 wherein said body is made out of flexible plastic material.

13. The container as defined in claim 10 wherein said body is made out of flexible polyurethane material.

14. The container as defined in claim 10 wherein said body is made out of polyvinyl chloride material.

15. The container as defined in claim 10 wherein said container is affixed to an adjacent container by adhesive means, the containers oriented upside down so that said opening of each container is on top to facilitate insertion and removal of an object from each of said containers after said closing member is removed and said golf balls have been removed.

16. The container as defined in claim 15 further comprising advertising indicia for a product located on at least one location of said exterior surface of each container and said containers are affixed to each other at a location remote from said advertising indicia so that the advertising indicia remains visible.

17. The container as defined in claim 10 wherein said flexible material is transparent which permits total visibility of said three golf balls.

18. The container as defined in claim 10 wherein said body of said container is reusable.

19. The container as defined in claim 10 wherein said closing member is removable.

20. The container as defined in claim 10 wherein said closing member is openable.

21. A container for housing a product, comprising:
   a. a body formed into a generally bullet shape having a tubular shaped vertically oriented structure terminating in an arcuate dome shaped top at one end and having a flat bottom at its other end with an opening extending through the bottom;
   b. said body further having an exterior surface and a hollow interior chamber for retaining a product, the hollow interior chamber connected with said opening to facilitate the insertion and removal of said product from the container, the opening being sealed by a closing means;
   c. said body being made of flexible material, said body being further made of material which permits visibility of said product when said product is within the hollow interior chamber, the flexibility of the body enabling the body to be deformable under ordinary pressure from a finger of a hand to thereby facilitate tactile feel of the product when said product is within the hollow interior chamber; and
   d. dimples molded into said exterior surface of said body to simulate a golf ball.

22. The container as defined in claim 21 further comprising advertising indicia for a product located on at least one location of said exterior surface.

23. The container as defined in claim 21 wherein said body is made out of flexible plastic material.

24. The container as defined in claim 16 wherein said body is made out of flexible polyurethane material.

25. The container as defined in claim 21 wherein said body is made out of polyvinyl chloride material.

26. The container as defined in claim 21 wherein said container is affixed to an adjacent container by adhesive means, the containers oriented upside down so that said opening of each container is on top to facilitate insertion and removal of an object from each of said containers after said closing means is removed and a product which was in each container has been removed.

27. The container as defined in claim 26 further comprising advertising indicia for a product located on at least one location of said exterior surface of each container and said containers are affixed to each other at a location remote from said advertising indicia so that the advertising indicia remains visible.

28. The container as defined in claim 21 wherein said flexible material is transparent which permits total visibility of said product.

29. The container as defined in claim 21 wherein said body of said container is reusable.

30. The container as defined in claim 21 wherein said closing means is removable.

31. The container as defined in claim 21 wherein said closing means is openable.

32. A container for a product, comprising:
   a. a body having an exterior surface, a hollow interior chamber for retaining a product and having an opening at a location in the body to facilitate the insertion and removal of said product from the container, the opening being sealed by a closing means;
   b. said body being made of flexible material, said body being further made of material which permits visibility of said product when said product is within the hollow interior chamber, the flexibility of the body enabling the body to be deformable under ordinary pressure from a finger of a hand to thereby facilitate tactile feel of said product when said product is within the hollow interior chamber; and
   c. dimples molded into said exterior surface of said body to simulate a golf ball.

33. The container as defined in claim 32 further comprising advertising indicia for a product located on at least one location of said exterior surface.

34. The container as defined in claim 32 wherein said body is made out of flexible plastic material.

35. The container as defined in claim 32 wherein said body is made out of flexible polyurethane material.

36. The container as defined in claim 32 wherein said body is made out of polyvinyl chloride material.

37. The container as defined in claim 32 wherein said container is affixed to an adjacent container by adhesive means, the containers oriented upside down so that said opening of each container is on top to facilitate insertion and removal of an object from each of said containers after said closing means is removed and a product which was in each container has been removed.

38. The container as defined in claim 37 further comprising advertising indicia for a product located on at least one location of said exterior surface of each container and said containers are affixed to each other at a location remote from said advertising indicia so that the advertising indicia remains visible.

39. The container as defined in claim 32 wherein said flexible material is transparent which permits total visibility of said product.

40. The container as defined in claim 32 wherein said body of said container is reusable.

41. The container as defined in claim 32 wherein said closing means is removable.

42. The container as defined in claim 32 wherein said closing means is openable.

* * * * *